United States Patent
Kim et al.

(10) Patent No.: US 8,559,991 B2
(45) Date of Patent: Oct. 15, 2013

(54) NETWORK APPARATUS AND METHOD FOR SELECTING TARGET TERMINAL TO PERFORM COMMUNICATION ACCORDING TO INTERFERENCE ALIGNMENT SCHEME

(75) Inventors: Young-Doo Kim, Seoul (KR); Chan Soo Hwang, Yongin-si (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 12/626,644

(22) Filed: Nov. 26, 2009

(65) Prior Publication Data

US 2010/0227635 A1    Sep. 9, 2010

(30) Foreign Application Priority Data

Mar. 9, 2009  (KR) .................. 10-2009-0019685

(51) Int. Cl.
*H04B 15/00*    (2006.01)
(52) U.S. Cl.
USPC .......................................... 455/501; 455/63.1
(58) Field of Classification Search
USPC ................................. 455/63.1, 501
See application file for complete search history.

(56) References Cited

U.S. PATENT DOCUMENTS

| | | | |
|---|---|---|---|
| 6,804,521 B2 | 10/2004 | Tong et al. | |
| 6,912,228 B1 * | 6/2005 | Dahlman et al. | 370/441 |
| 7,299,073 B2 * | 11/2007 | Wilson et al. | 455/562.1 |
| 7,933,250 B2 * | 4/2011 | Tsybakov et al. | 370/335 |
| 8,036,098 B2 * | 10/2011 | Pereira et al. | 370/201 |
| 2002/0110101 A1 * | 8/2002 | Gopalakrishnan et al. | 370/335 |
| 2009/0207822 A1 * | 8/2009 | Kim et al. | 370/338 |
| 2010/0080323 A1 * | 4/2010 | Mueck et al. | 375/296 |
| 2012/0020319 A1 * | 1/2012 | Song et al. | 370/330 |

FOREIGN PATENT DOCUMENTS

| | | |
|---|---|---|
| WO | WO 2007/107097 | 9/2007 |
| WO | WO 2008/096383 | 8/2008 |
| WO | WO 2009024018 A1 * | 2/2009 |

OTHER PUBLICATIONS

Sridharan, S., et al., "Capacity of Symmetric K-User Gaussian Very Strong Interference Channels," Dept. of Electr. & Comput. Eng., Univ. of Texas at Austin, Austin, TX, Global Telecommunications Conference, 2008. IEEE GLOBECOM 2008. Dec. 18, 2008, arXiv:0808.2314v1 [cs.IT], pp. 1-5.

Gomadam K., et al., "Approaching the capacity of Wireless Networks through Distributed Interference Alignment," Electrical Engineering and Computer Science, University of California, Irvine, CA., Global Telecommunications Conference, 2008. IEEE GLOBECOM 2008. IEEE, Dec. 8, 2008, pp. 1-5.

Cadambe et al., "Interference Alignment and Degrees of Freedom of the K-User Interference Channel," IEEE Transactions on Information Theory, vol. 54, No. 8, pp. 3425-3441, Aug. 2008.

* cited by examiner

*Primary Examiner* — Gennadiy Tsvey
(74) *Attorney, Agent, or Firm* — NSIP Law (57) ABSTRACT

Provided is a signal transmission system including a terminal to receive a signal using an interference alignment scheme, and a transmitting base station to transmit, to the terminal, a signal where interference is aligned. The transmitting base station may select, from a plurality of terminals, a target terminal to receive the signal using the interference alignment scheme. The selected target terminal may receive the signal from the transmitting base station and receive interference signals from a plurality of interference base stations.

13 Claims, 6 Drawing Sheets

NETWORK APPARATUS AND METHOD FOR SELECTING TARGET TERMINAL TO PERFORM COMMUNICATION ACCORDING TO INTERFERENCE ALIGNMENT SCHEME

CROSS-REFERENCE TO RELATED APPLICATION(S)

This application claims the benefit under 35 U.S.C. §119 (a) of a Korean Patent Application No. 10-2009-0019685, filed on Mar. 9, 2009, in the Korean Intellectual Property Office, the entire disclosure of which is incorporated herein by reference for all purposes.

BACKGROUND

1. Field

The following description relates to a radio communication system, and more particularly, to a network apparatus that may select, from a plurality of terminals, a target terminal to receive a transmission signal, and a method of selecting the target terminal.

2. Description of the Related Art

With the rapid development of signal transmission in radio communication networks, advancements in technology may allow greater amounts of signals than are presently able to be transmitted to be transmitted via radio communication networks.

A conventional radio communication network may include a plurality of base stations and a plurality of terminals. The terminal may receive a transmission signal from the base station. The terminal may receive an interference signal from a neighboring base station that is adjacent to a serving base station. The interference signal may decrease a transmission efficiency of the radio communication network, such as a data rate of the transmission signal and the like.

A state of a radio channel formed between the base station and the terminal may vary over time. For example, the data rate may be relatively high in a time slot or a frequency slot with an excellent radio channel state, whereas the data rate may decrease in a time slot or a frequency slot with a bad radio channel state. Accordingly, there is a need for a new signal transmission technology that may select terminals with an excellent radio channel state from a plurality of terminals that receive a transmission signal from a base station to thereby enhance a data rate.

SUMMARY

In one general aspect, there is provided a network apparatus including a receiver configured to receive, from a plurality of terminals, signal quality information between a plurality of base stations and the plurality of terminals, a terminal grouping unit configured to group the plurality of terminals into a plurality of terminal groups based on the signal quality information and to determine a transmitting base station among the plurality of base stations with respect to each of the terminal groups, and a terminal selection unit configured to select, from each of the terminal groups, a target terminal to be applied with an interference alignment scheme, wherein the target terminal may receive, from an interference base station adjacent to the transmitting base station, an interference signal where the interference alignment scheme is applied.

The terminal selection unit may include a candidate terminal selection unit to select at least one candidate terminal from a plurality of terminals included in each of the terminal groups, based on the signal quality information, where a number of the terminals is greater than a predetermined reference value, and the terminal selection unit may select, from the at least one candidate terminal, a target terminal to be applied with the interference alignment scheme.

The signal quality information may include any one of a signal-to-noise ratio (SNR) or a signal-to-interference and noise ratio (SINR).

The terminal grouping unit may group, into the plurality of terminal groups, a plurality of terminals of which the signal quality information is greater than or equal to a predetermined reference value.

Each of the base stations may transmit a pilot signal to the plurality of terminals, and the signal quality information may be generated based on the pilot signal.

The terminal selection unit may calculate a data rate with respect to each of terminals included in each of the terminal groups, based on the signal quality information, and may determine the target terminal based on the data rate.

In another general aspect, a terminal may include a signal quality information generation unit configured to generate signal quality information with respect to a transmitting base station and a plurality of interference base stations adjacent to the transmitting base station, a transmitter configured to transmit the signal quality information to the transmitting base station, and a receiver, wherein the transmitting base station may select at least one candidate terminal from terminals included in a terminal group, and may determine a target terminal among the at least one candidate terminal and where the terminal is determined as the target terminal, the receiver may receive, from the plurality of interference base stations among the plurality of base stations, an interference signal where an interference alignment scheme is applied.

The network apparatus may determine a terminal group that includes the terminal and corresponds to the transmitting base station, and where a number of terminals included in the terminal group is greater than or equal to a predetermined reference value, the network apparatus may select a candidate terminal based on the signal quality information, and may select, as the target terminal, the terminal from candidate terminals of each of the base stations, based on a data rate with respect to a combination of the candidate terminals.

The signal quality information may include an SNR or an SINR.

In still another general aspect, a method of transmitting data may include receiving, from a plurality of terminals, signal quality information between a plurality of base stations and the plurality of terminals, grouping the plurality of terminals into a plurality of terminal groups based on the signal quality information to determine a transmitting base station among the plurality of base stations with respect to each of the terminal groups, and selecting, from each of the terminal groups, a target terminal to be applied with an interference alignment scheme wherein the target terminal may receive, from an interference base station adjacent to the transmitting base station, an interference signal where the interference alignment scheme is applied.

The method may further include selecting at least one candidate terminal from a plurality of terminals included in each of the terminal groups, based on the signal quality information, where a number of the terminals is greater than a predetermined reference value, wherein the selecting includes selecting, from the at least one candidate terminal, a target terminal to be applied with the interference alignment scheme.

The signal quality information may include an SNR or an SINR.

The grouping may include grouping, into the plurality of terminal groups, a plurality of terminals of which the signal quality information is greater than or equal to a predetermined reference value.

Each of the base stations may transmit a pilot signal to the plurality of terminals, and the signal quality information may be generated based on the pilot signal.

The selecting may include calculating a data rate with respect to each of terminals included in each of the terminal groups, based on the signal quality information, and determining the target terminal based on the data rate.

In another general aspect, there is provided a computer-readable recording medium storing a program to implement a method of transmitting data, including instructions to cause a computer to receive, from a plurality of terminals, signal quality information between a plurality of base stations and the plurality of terminals, group the plurality of terminals into a plurality of terminal groups based on the signal quality information to determine a transmitting base station among the plurality of base stations with respect to each of the terminal groups, and select, from each of the terminal groups, a target terminal to be applied with an interference alignment scheme, wherein the target terminal receives, from an interference base station adjacent to the transmitting base station, an interference signal where the interference alignment scheme is applied.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, description of well-known functions and constructions are omitted to increase clarity and conciseness.

Figure 1:
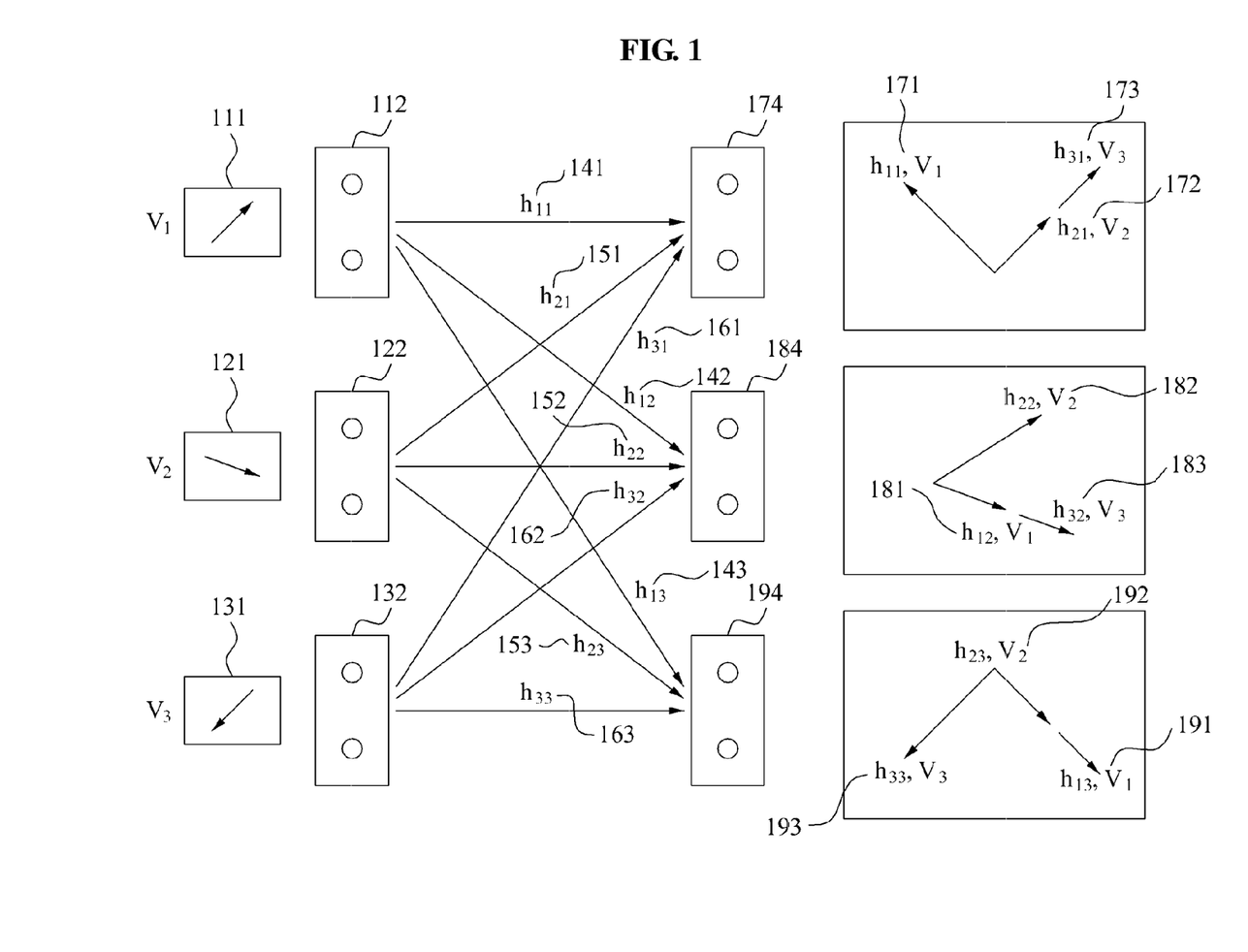
FIG. 1 is a diagram illustrating an exemplary interference alignment scheme.

FIG. 1 illustrates an exemplary interference alignment scheme.

A signal transmission system according to one implementation may include a plurality of base stations 112, 122, and 132, and a plurality of terminals 174, 184, and 194. The terminal 174 may receive a transmission signal $V_1$ 111 from the base station 112 corresponding to a first base station. The terminal 174 may receive transmission signals ($V_2$, $V_3$) 121 and 131 corresponding to interference signals from the base stations 122 and 132 that are adjacent to the base station 112. The interference signals ($V_2$, $V_3$) 121 and 131 received from the base stations 122 and 132 may decrease a reception performance of the transmission signal $V_1$ 111 that is transmitted from the base station 112. The terminal 174 may enhance the reception performance of the transmission signal $V_1$ 111 by canceling or controlling the interference signals ($V_2$, $V_3$) 121 and 131 among received signals that include the transmission signal $V_1$ 111 and the interference signals ($V_2$, $V_3$) 121 and 131.

To decrease the effect of interference signals, an interference base station may control a phase of an interference signal that is transmitted to a terminal receiving a service from another base station. For example, referring to FIG. 1, the base stations 122 and 123 may control a phase of the interference signals ($V_2$, $V_3$) 121 and 131 which are transmitted to the terminal 174, so that a phase of the interference signal $V_2$ 121 received from the base station 122 may be the same as the phase of the interference signal $V_3$ 131 received from the base station 132.

A phase of the transmission signal $V_1$ 111 transmitted from the base station 112 may vary while passing through a radio channel $h_{11}$ 141 formed between the base station 112 and the terminal 174. The terminal 174 may receive a phase-shifted signal $h_{11}V_1$ 171 where a phase of the transmission signal $V_1$ 111 is shifted while passing through the radio channel $h_{11}$ 141.

The base stations 122 and 132 may control a phase of the transmission signals ($V_2$, $V_3$) 121 and 131 corresponding to the interference signals against the terminal 174 to be the same as one another. For example, when a phase $h_{21}V_2$ 172 of the transmission signal $V_2$ 172 is the same as a phase $h_{31}V_3$ 173 of the transmission signal $V_3$ 173, it may be considered that the terminal 174 receives only a single interference signal that is transmitted at a higher transmission power. A number of interference signals may increase. Even in this case, when a phase of interference signals received by the terminal 174 is the same, it may be considered that the terminal 174 receives only a single interference signal.

The terminal 174 may cancel the plurality of interference signals ($V_2$, $V_3$) 121 and 131 with the same phase.

The transmission signal $V_1$ 111 transmitted from the base station 112 to the terminal 174, and the transmission signal $V_3$ 131 transmitted from the base station 132 to the terminal 194 may act as interference signals against the terminal 184. The terminal 184 may receive, from the base stations 112 and 132, interference signals with a controlled phase to thereby cancel the interference signals. This scheme may be applicable to the terminal 194.

More specifically, terminal 174 receives a signal from: (1) base station 112 through radio channel $h_{11}$ 141, (2) base station 122 through radio channel $h_{21}$ 151, and (3) base station 132 through radio channel $h_{31}$ 161. Terminal 184 receives a signal from: (1) base station 112 through radio channel $h_{12}$ 142, (2) base station 122 through radio channel $h_{22}$ 152, and (3) base station 132 through radio channel $h_{32}$ 162. Terminal 194 receives a signal from: (1) base station 112 through radio channel $h_{13}$ 143, (2) base station 122 through radio channel $h_{23}$ 153, and (3) base station 132 through radio channel $h_{33}$ 163.

Similar to terminal 174, terminal 184 receives a phase-shifted signal $h_{22}V_2$ 182 from signal $V_2$ 121 passing through radio channel $h_{22}$ 152, a phase-shifted signal $h_{12}V_1$ 181 from signal $V_1$ 111 passing through radio channel $h_{12}$ 142, and a phase-shifted signal $h_{32}V_3$ 183 from signal $V_3$ 131 passing through radio channel $h_{32}$ 162. Terminal 184 may cancel interference signals ($V_1$, $V_3$) of the same phase.

Similarly, terminal 194 receives a phase-shifted signal $h_{33}V_3$ 193 from signal $V_3$ 131 passing through radio channel $h_{33}$ 163, a phase-shifted signal $h_{13}V_1$ 191 from signal $V_1$ 111 passing through radio channel $h_{13}$ 143, and a phase-shifted signal $h_{23}V_2$ 192 from signal $V_2$ 121 passing through radio channel $h_{23}$ 153. Terminal 194 may cancel interference signals ($V_1$, $V_2$) of the same phase.

Figure 2:
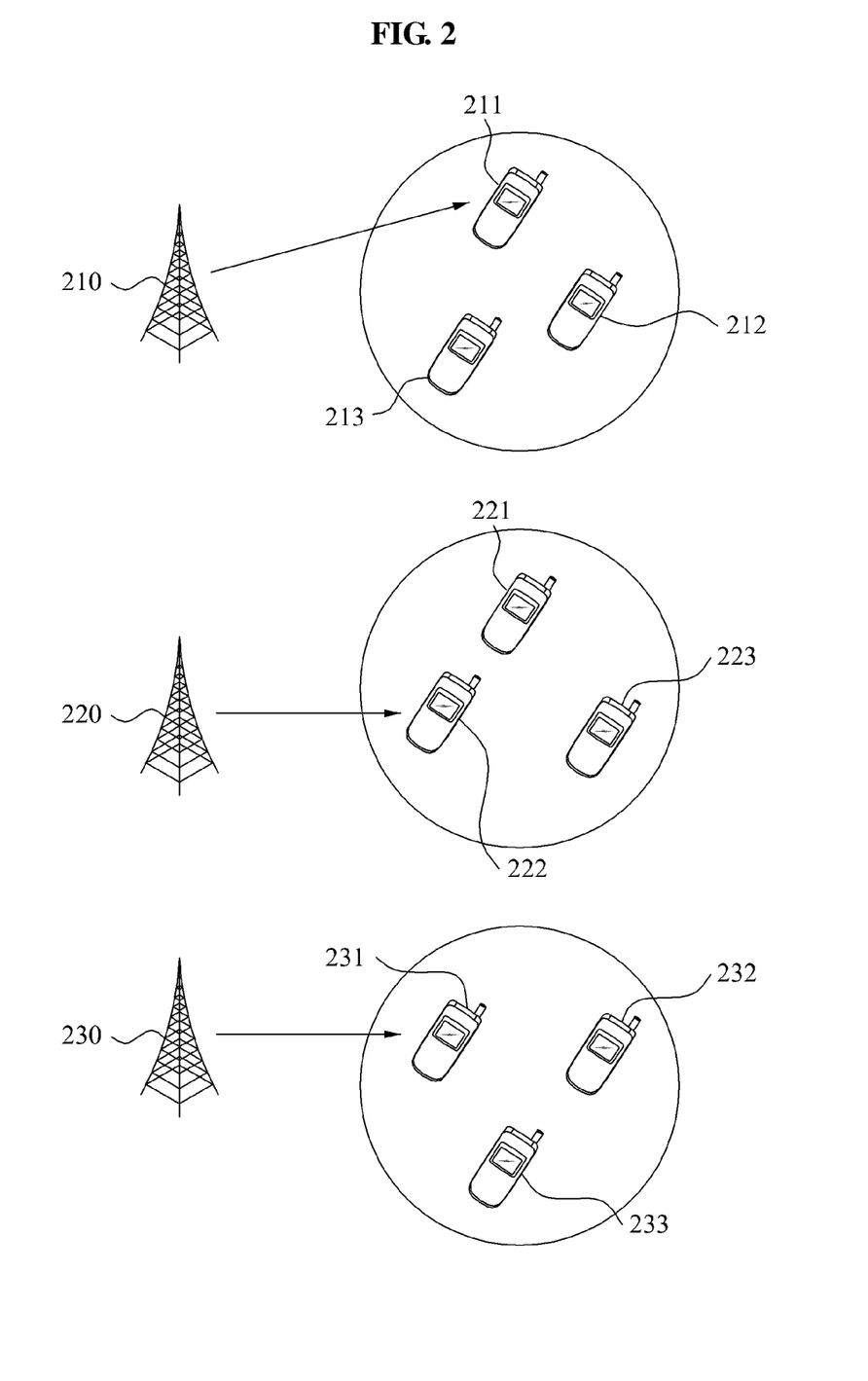
FIG. 2 is a diagram illustrating selection of a terminal to communicate with a transmitting base station.

FIG. 2 illustrates an example of selecting a terminal to communicate with a transmitting base station.

Referring to FIG. 2, a plurality of terminals 211, 212, 213, 221, 222, 223, 231, 232, and 233 included in a signal transmission system may access any one of a plurality of base stations 210, 220, and 230. Where a transmitting base station is determined among the plurality of base stations 210, 220, and 230 to transmit a transmission signal to each of the terminals 211, 212, 213, 221, 222, 223, 231, 232, and 233, each of the terminals 211, 212, 213, 221, 222, 223, 231, 232, and 233 may access the determined transmitting base station to receive the transmission signal.

For better comprehension and ease of description, it is assumed hereinafter that a single transmitting base station transmits data to only a single terminal.

Generally, a number of the terminals 211, 212, 213, 221, 222, 223, 231, 232, and 233 included in the signal transmission system may be greater than a number of the base stations 210, 220, and 230 that are the transmitting base stations. Accordingly, a terminal group may be set with respect to each of the transmitting base stations 210, 220, and 230 by grouping the terminals 211, 212, 213, 221, 222, 223, 231, 232, and 233 to receive the transmission signal from each of the transmitting base stations 210, 220, and 230. The terminal group may be set based on signal quality information that is fed back from each of terminals to a corresponding transmitting base station in association with a transmission signal, for example, a pilot signal that transmitted from the transmitting base station to the terminals. The signal quality information may include a signal-to-noise ratio (SNR).

The transmitting base station may select, from terminals included in the terminal group, a target terminal to receive the transmission signal.

Referring to FIG. 2, the terminals 211, 212, 213, 221, 222, 223, 231, 232, and 233 are grouped into three terminal groups. A case where a network apparatus selects, as the target terminal, a single terminal from each of the three terminal groups will be described. In FIG. 2, for example, the terminals 211, 221, and 231 may be selected as the target terminals. The three terminal groups may include the terminals 211, 212, and 213, 221, 222, and 223, and 231, 232, and 233, respectively. In order to select a single target terminal from each of the terminal groups, a target terminal selection operation to retrieve an optimal combination may need to be performed with respect to 27 combinations (i.e., 3×3×3=27). The target terminal selection operation may be used to retrieve a combination to optimize a signal transmission performance where an interference alignment scheme is applied. For example, the signal transmission performance may be a data rate.

The target terminal selection operation may calculate a data rate with respect to each of a plurality of combinations using signal quality information that is fed back from each of terminals. The signal quality information may include an SNR with respect to a transmitting base station or a signal-to-interference plus noise ratio (SINR) with respect to the transmitting base station and an interference base station. The data rate may be calculated by further considering signal quality information associated with the interference base station. Also, the data rate may be calculated based on an instantaneous SNR or an instantaneous SINR.

A network apparatus may perform a target terminal selection operation with respect to all the combinations or at least one combination thereof, which may be adjusted by considering an operation load of the network apparatus. For example, when a reference value associated with a number of combinations that are an operation target is pre-determined, and the number of combinations is less than or equal to the reference value, the target terminal selection operation may be performed with respect to all the combinations. When the number of combinations is greater than the reference value, the target terminal selection operation may be performed with respect to the at least one of the combinations. Through the above process, the number of combinations that are the target of the target terminal selection operation may decrease.

Figure 3:
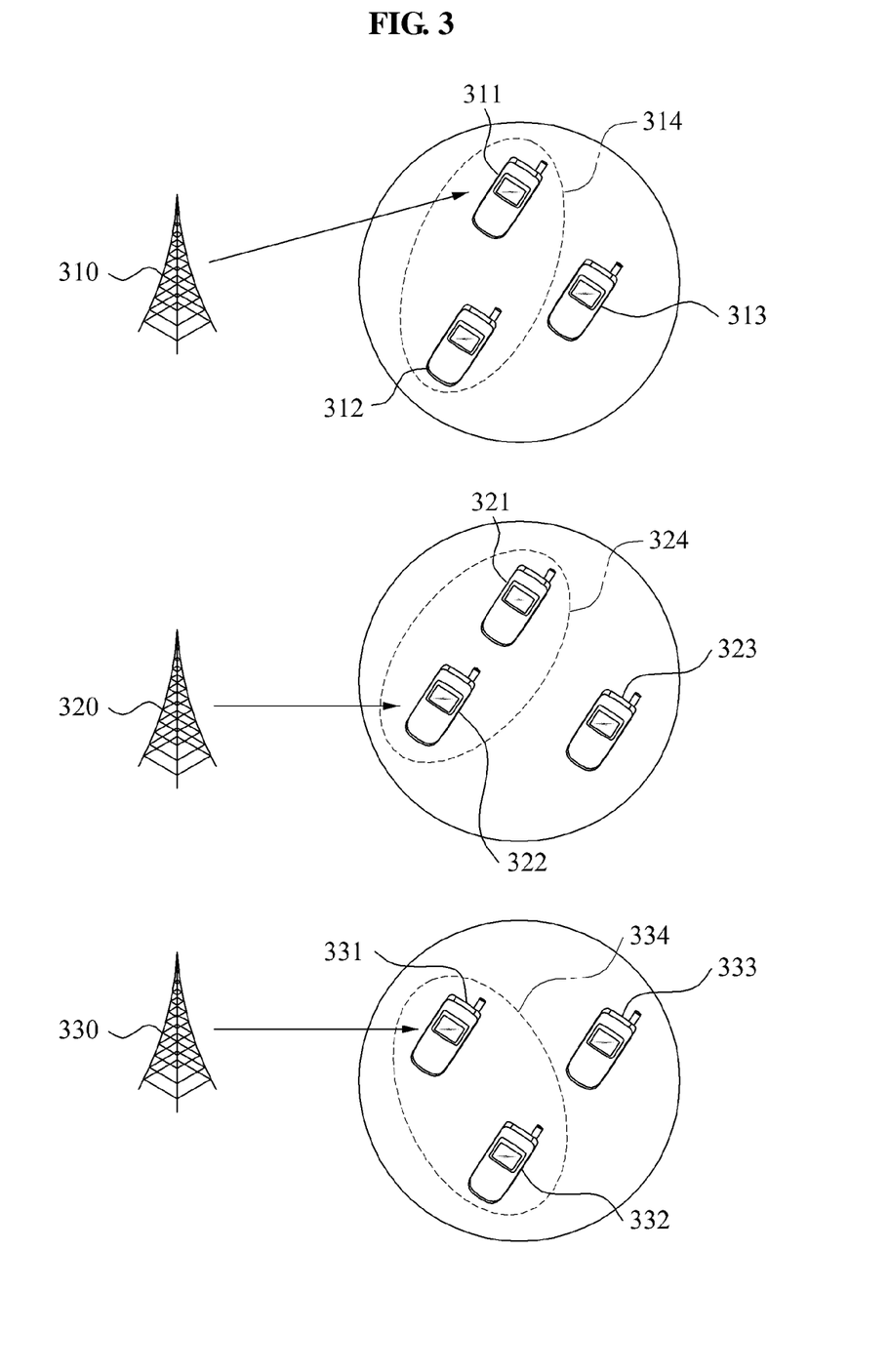
FIG. 3 is a diagram illustrating an operation of determining candidate terminals from terminals included in a terminal group to determine a target terminal by performing a target terminal selection operation with respect to the candidate terminals.

FIG. 3 illustrates an example of determining candidate terminals from terminals included in a terminal group to determine a target terminal by performing a target terminal selection operation with respect to the candidate terminals.

Referring to FIG. 3, in order to select candidate terminals, a network apparatus may use signal quality information that is fed back from terminals 311, 312, 313, 321, 322, 323, 331, 332, and 333 to transmitting base stations 310, 320, and 330. The signal quality information may include an SNR or an SINR. The network apparatus may calculate a data rate with respect to each of combinations using the signal quality information and may select, as the candidate terminals, terminals of which the data rate is greater than or equal to a predetermined reference value. Referring to FIG. 3, two terminals are selected as the candidate terminals from each of the terminal groups. For example, the terminals 311 and 312 indicated by a dotted line 314, the terminals 321 and 322 indicated by a dotted line 324, and the terminals 331 and 332 indicated by a dotted line 334 are selected as the candidate terminals from the respective terminal groups.

In FIG. 3, the network apparatus may perform the aforementioned target terminal selection operation with respect to eight combinations (i.e., 2×2×2=8) in order to select the target terminal from the candidate terminals 311, 312, 321, 322, 331, and 332. Accordingly, the network apparatus may perform the target terminal selection operation with respect to eight combinations out of a total of 27 combinations. Accordingly, a system load corresponding to the target terminal selection operation may be decreased.

Where an interference alignment scheme is applied, a network apparatus may select, as a target terminal, a terminal of a combination that optimizes a signal transmission performance.

Figure 4:
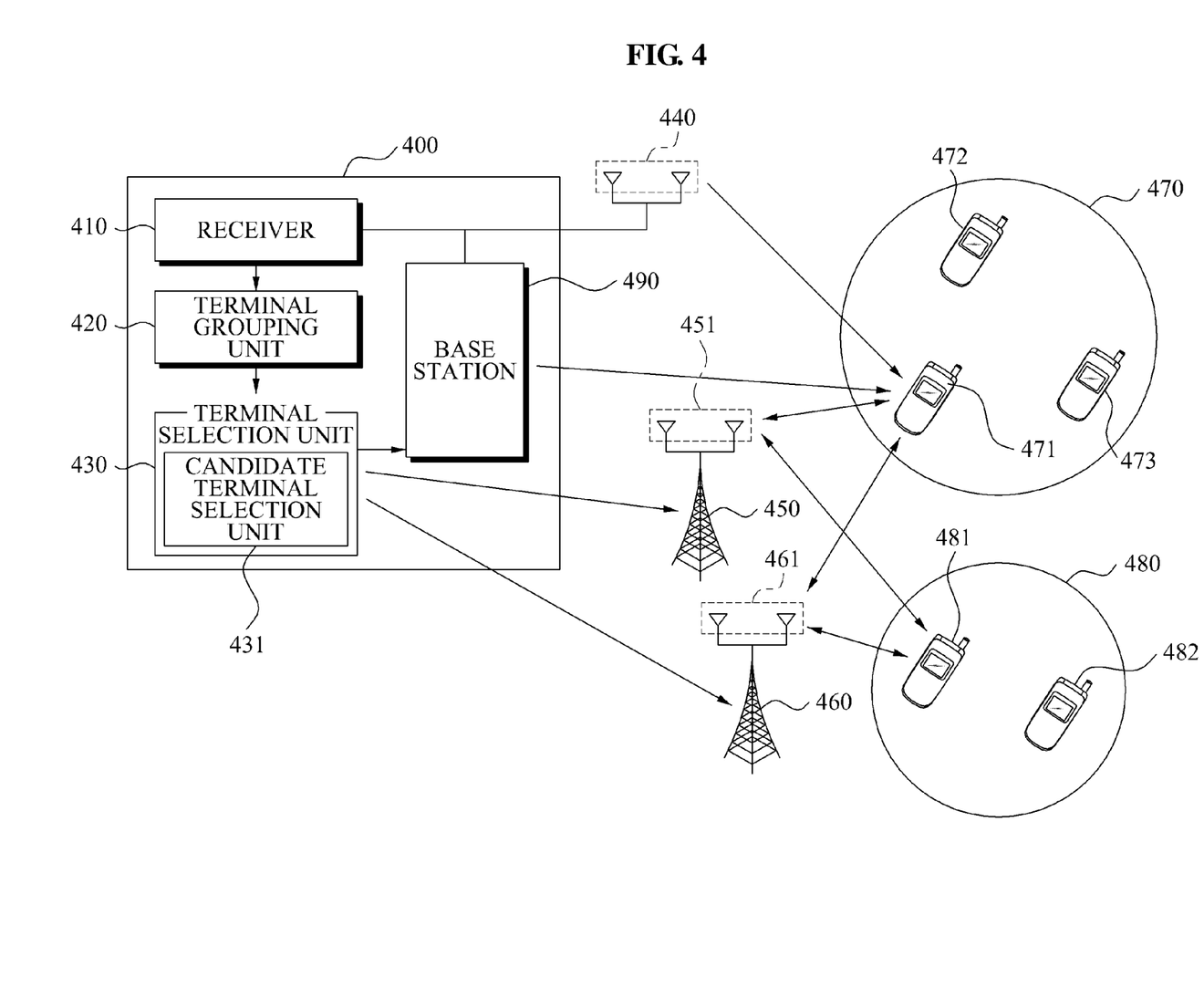
FIG. 4 is a block diagram illustrating a structure of an exemplary network apparatus.

FIG. 4 illustrates a structure of an exemplary network apparatus 400.

The network apparatus 400 includes a receiver 410, a terminal grouping unit 420, and a terminal selection unit 430. Although the network apparatus 400 is configured to include a base station 490 in FIG. 4, the network apparatus 400 may be configured as a device that is physically or logically separate from the base station 490. For example, the network apparatus 400 may be configured as a radio network controller. Hereinafter, an implementation where the network apparatus 400 is configured to include the base station 490 will be described with reference to FIG. 4.

The receiver 410 may receive signal quality information that is fed back from a plurality of terminals 471, 472, 473, 481, and 482. The receiver 410 may directly receive the signal quality information from the plurality of terminals 471, 472, 473, 481, and 482, and may also receive the signal quality information via corresponding base stations 490, 450, and 460.

The signal quality information may include any one of an SINR or an SNR between the base stations 490, 450, and 460, and the terminals 471, 472, 473, 481, and 482. The signal quality information may include an average SNR or an average SINR that is obtained by averaging the SNR or the SINR in a predetermined time slot.

Each of the base stations 490, 450, and 460 may transmit a pilot signal to each of the terminals 471, 472, 473, 481, and 482. Each of the terminals 471, 472, 473, 481, and 482 may generate the signal quality information based on the pilot signal, and feed back the generated signal quality information to each of the base stations 490, 450, and 460.

The terminal grouping unit 420 may group the plurality of terminals 471, 472, 473, 481, and 482 into a plurality of terminal groups 470 and 480 based on the signal quality information. Accordingly, the average SNR may be used as the signal quality information.

The terminal grouping unit 420 may determine a transmitting base station with respect to each of the terminal groups 470 and 480. The terminal grouping unit 420 may group, into a plurality of terminal groups, terminals of which signal quality information is greater than or equal to a predetermined reference value.

Furthermore, the terminal grouping unit 420 may group, into the same terminal group, terminals of which signal quality information with respect to the base stations 490, 450, and 460 is greater than or equal to the predetermined reference value. For example, when the signal quality information, for example, the average SNR between the base station 490 and the terminals 471, 472, and 473 is greater than or equal to the predetermined reference value, the terminals 471, 472, and 473 may be grouped into the terminal group 470, and the terminals 481 and 482 may be grouped into the terminal group 480. Also, the base station 490 may be determined as a transmitting base station with respect to the terminal group 470, and the base station 450 may be determined as the transmitting base station with respect to the terminal group 480. The terminals 471, 472, and 473 included in the terminal group 470 may receive a transmission signal from the base station 490. The terminals 481 and 482 included in the terminal group 480 may receive a transmission signal from the base station 450. Although not illustrated in FIG. 4, other terminals may be grouped into another terminal group and the base station 460 may be determined as the transmitting base station.

The terminal selection unit 430 may select, from each of terminal groups, a target terminal to be applied with an interference alignment scheme. Referring to FIG. 4, the terminal 471 may be selected, as the target terminal, from the terminal group 470. The terminal 481 may be selected, as the target terminal, from the terminal group 480. The terminal 471 may receive a transmission signal from the transmitting base station 490, and the terminal 481 may receive a transmission signal from the transmitting base station 450.

In order to transmit a transmission signal by applying the interference alignment scheme to the target terminal, phases of transmission signals transmitted from the base stations 490, 450, and 460 may be associated with each other. Since a transmission signal transmitted to a particular terminal functions as an interference signal against another terminal, the target terminal selection operation may be performed with respect to each of combinations of terminals included in a terminal group by considering the above mutual association. A combination with a desired operation result may be selected as the target terminal.

The terminal selection unit 430 may perform the target terminal selection operation with respect to each of combinations, as described above with reference to FIG. 3. The target terminal selection operation may calculate a data rate with respect to each of the combinations using signal quality information that is fed back from each terminal. The signal quality information may include an SNR with respect to a transmitting base station or an SINR with respect to the transmitting base station and an interference base station. The data rate may be calculated by further considering the signal quality information with respect to the interference base station and may also be calculated based on an instantaneous SNR or an instantaneous SINR. The terminal selection unit 430 may select the target terminal based on the data rate that is obtained through the target terminal selection operation. Accordingly, the terminal selection unit 430 may select a combination with a maximum data rate and select, as the target terminal, a terminal included in the combination with the maximum data rate.

The terminal selection unit 430 may generate a combination based on a number of transmission signals that each base station may transmit using the interference alignment scheme. For example, when the base station 490 may transmit two transmission signals, two terminals may be selected from the terminal group 470. When the base station 450 may transmit only a single transmission signal, a single terminal may be selected from the terminal group 480. Through this selection, the combination may be generated.

The terminal selection unit 430 may perform the target terminal selection operation with respect to all the probable combinations or with respect to at least one of the probable combinations, which may be adjusted by considering a calculation load of the network apparatus 400. For example, when a reference value associated with a number of operation target combinations is pre-determined and the number of operation target combinations is less than or equal to the reference value, the network apparatus 400 may perform the target terminal selection operation. When the number of operation target combinations is greater than the reference value, the network apparatus 400 may perform the target terminal selection operation. During this process, it is possible to decrease the number of operation target combinations associated with the target terminal selection operation. The process may be performed by a candidate terminal selection unit 431.

The terminal selection unit 430 may include the candidate terminal selection unit 431. When it is determined that the number of combinations for which the terminal selection unit 430 may need to perform the target terminal selection operation is greater than the predetermined reference value, the candidate terminal selection unit 431 may select at least one candidate terminal from terminals included in each of terminal groups. The terminal selection unit 430 may perform the target terminal selection operation to select the target terminal.

In order to select the at least one candidate terminal, the candidate terminal selection unit 431 may use signal quality information that is fed back from the terminals 471, 472, 473, 481, and 482 belonging to the terminal groups 470 and 480 to the base stations 490, 450, and 460. The signal quality information may include an SNR or an SINR. The network apparatus 400 may calculate a data rate with respect to each of combinations using the signal quality information, and may select, as candidate terminals, terminals of which the data rate is greater than or equal to a predetermined value.

The base stations 490, 450, and 460 may include antenna units 440, 451, and 461, respectively. Each of the antenna units 440, 451, and 461 may include a plurality of antennas. Each of the base stations 490, 450, and 460 may multiply data and a precoding matrix to control a phase of a transmission signal that is transmitted via each of the antenna units 440, 451, and 461. The terminal selection unit 430 may assume an arbitrary precoding matrix and calculate a data rate with respect to each of a plurality of combinations.

The candidate terminal selection unit 431 may also select a single candidate terminal from each of terminal groups. In this case, since the candidate terminal is single, the corresponding candidate terminal may be selected as the target terminal without a need to perform the target terminal selection operation.

Figure 5:
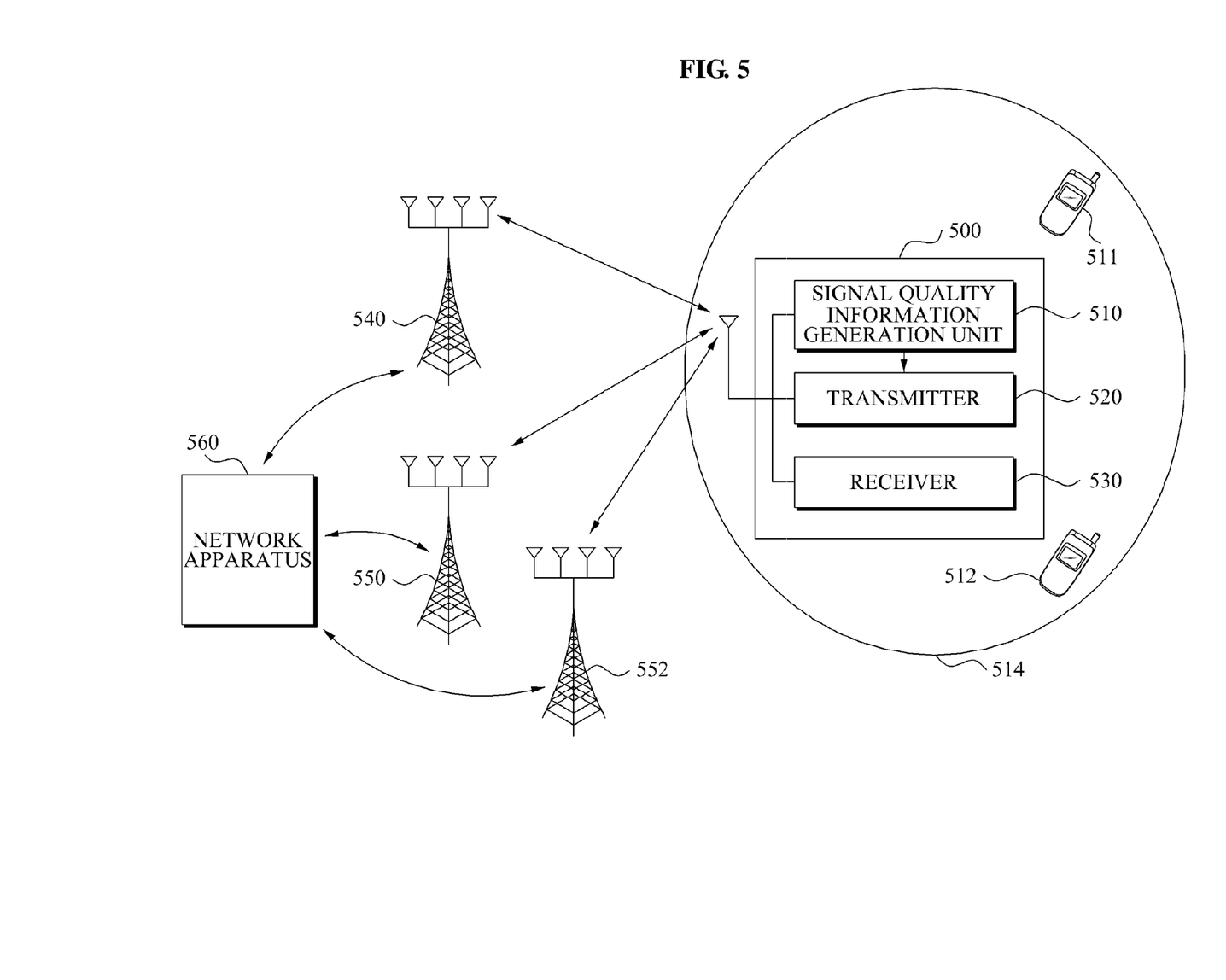
FIG. 5 is a block diagram illustrating a structure of an exemplary terminal.

FIG. 5 illustrates a structure of an exemplary terminal 500. The terminal 500 includes a signal quality information generation unit 510, a transmitter 520, and a receiver 530.

The signal quality information generation unit 510 may generate signal quality information with respect to a plurality of base stations 540, 550, and 552. The signal quality information may include an SNR with respect to the base station 540 corresponding to a transmitting base station, or an SINR with respect to the base station 540, and the base stations 550 and 552 corresponding to interference base stations of the base station 540.

The receiver 530 may receive a pilot signal from the plurality of base stations 540, 550, and 552. The signal quality information generation unit 510 may generate the signal quality information based on the received pilot signal.

The transmitter 520 may feed back the signal quality information to a network apparatus 560.

The network apparatus 560 may group a plurality of terminals 500, 511, and 512 into a terminal group 514 using signal quality information that is fed back from the plurality of terminals 500, 511, and 512. The terminals 500, 511, and 512 included in the same terminal group 514 may receive signals from the same base station 540.

Accordingly, a plurality of terminals may be grouped into a terminal group using fed back signal quality information. A method of selecting, by a network apparatus, a target terminal has been described above and thus further description related thereto will be omitted for conciseness.

Figure 6:
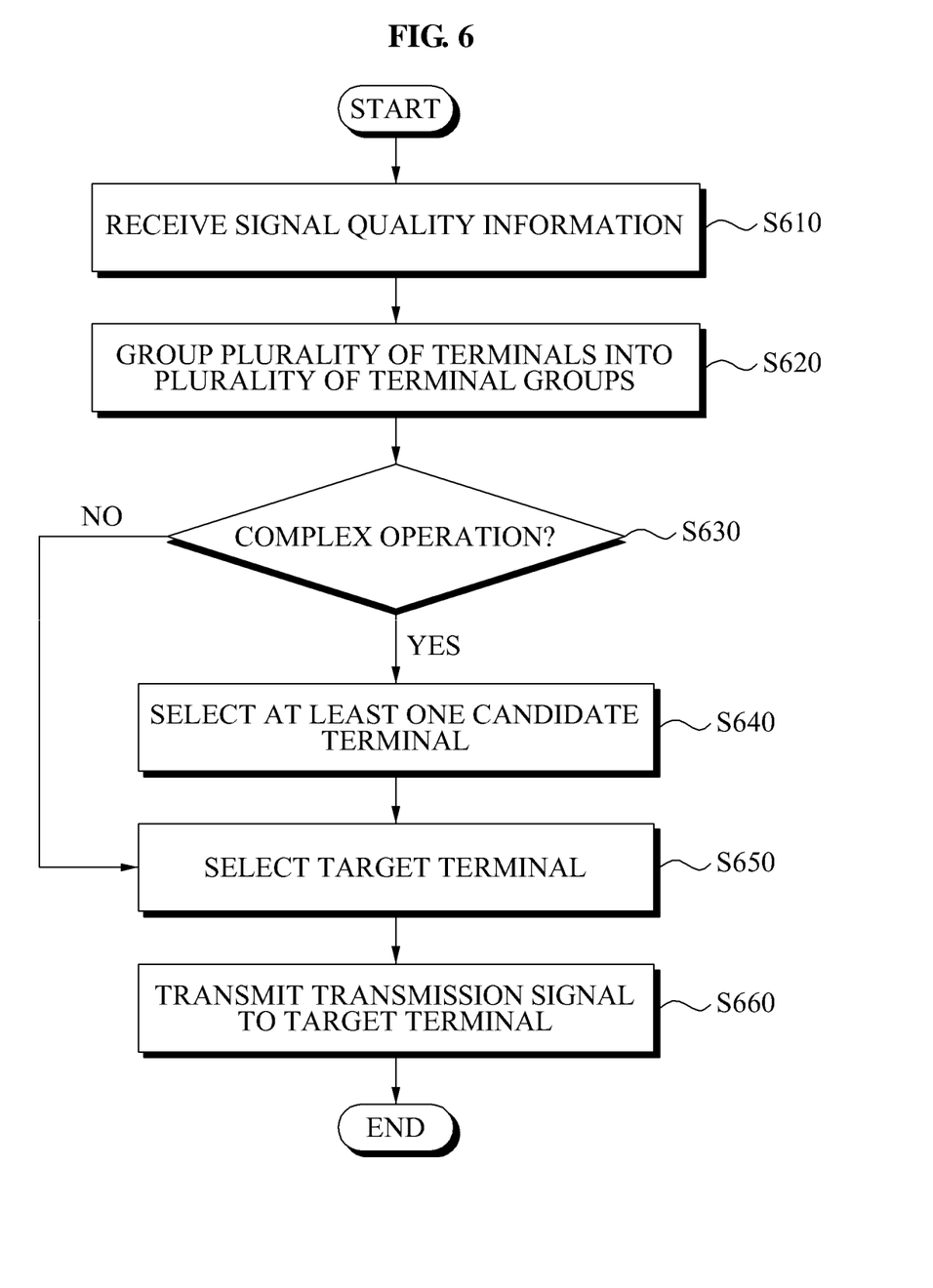
FIG. 6 is a flowchart illustrating an exemplary method of transmitting data.

FIG. 6 is a flowchart illustrating an exemplary method of transmitting data. The method of transmitting data may be performed by a network apparatus described above.

In operation S610, the network apparatus receives, from a plurality of terminals, signal quality information between a plurality of base stations and the plurality of terminals. As described above, the network apparatus may receive the signal quality information directly from the terminals or may also receive the signal quality information via the base stations. The signal quality information may include any one of an SNR with respect to a transmitting base station and an SINR with respect to the transmitting base station and an interference base station.

In operation S620, the network apparatus groups the plurality of terminals into a plurality of terminal groups based on the signal quality information, and determines a transmitting base station from the plurality of base stations with respect to each of the terminal groups. Terminals included in the same terminal group may receive data from the determined transmitting base station.

The network apparatus may group, into a plurality of terminal groups, a plurality of terminals of which signal quality information is greater than or equal to a predetermined reference value in operation S620. The signal quality information used to group the terminals into the terminal groups may include an SNR or an SINR with respect to each of the base stations.

In operation S630, the network apparatus determines whether to perform a complex operation to select a target terminal. Where it is determined that a calculation amount of a target terminal selection operation to select the target terminal is great, for example, where a number of combinations to perform the target terminal selection operation is greater than a predetermined reference value, the network apparatus additionally performs an operation of selecting candidate terminals in operation S640.

Where it is determined that the complex operation is not performed in operation S630, for example, where the number of combinations to perform the target terminal selection operation is less than or equal to the reference value, the network apparatus selects the target terminal in operation S650. The method of selecting the target terminals has been described above and thus further description related thereto will be omitted for conciseness.

Where it is determined that the complex operation is performed in operation S630, the network apparatus selects the candidate terminals in operation S640. That is, the network apparatus may select at least one candidate terminal based on signal quality information. Also, the network apparatus may determine, as the candidate terminals, terminals having desired signal quality information among terminals included in a terminal group.

In operation S650, the network apparatus may select the target terminal by performing the target terminal selection operation with respect to the candidate terminals. The signal quality information used to calculate a data rate in operation S650 may include an instantaneous SNR or an instantaneous SINR.

In operation S660, the network apparatus transmits a transmission signal to the target terminal. The target terminal may receive the transmission signal from the transmitting base station and may also receive, from a plurality of interference base stations adjacent to the transmitting base station, a plurality of interference signals of which phases are controlled to be the same.

The methods described above including a data transmission method may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A network apparatus comprising:
a receiver configured to receive, from each of a plurality of terminals, signal quality information indicating the quality of a signal received from each of a plurality of base stations;
a terminal grouping unit configured to group the plurality of terminals into a plurality of terminal groups, based on the signal quality information, and to respectively associate first, second and third base stations, of the plurality of base stations, with first, second and third terminal groups, of the plurality of terminal groups; and
a terminal selection unit configured to select concurrently a first target terminal from the first terminal group, a second target terminal from the second terminal group and a third target terminal from the third terminal group, wherein:
the association of a base station with a terminal group identifies which base station is assigned to transmit data to the terminal group, and
the network apparatus causes the second base station to adjust the phase of its transmission so as to be received, by the first target terminal, in alignment with the phase of a transmission by the third base station, causes the first base station to adjust the phase of its transmission so as to be received, by the second target terminal, in alignment with the phase of a transmission by the third base station and causes the first base station to adjust the phase of its transmission so as to be received, by the third target terminal, in alignment with the phase of a transmission by the second base station, and
the terminal selection unit configured to select concurrently the first, second, third target terminals based on a total data rate with respect to a combination of the each terminal of the first, second and third terminal groups.

2. The network apparatus of claim 1, wherein the signal quality information is a signal-to-noise ratio (SNR) or a signal-to-interference and noise ratio (SINR).

3. The network apparatus of claim 1, wherein the terminal grouping unit groups, into each terminal group, a plurality of terminals that reported, to the network apparatus, having a received signal quality for the associated base station that is greater than or equal to a predetermined reference value.

4. The network apparatus of claim 1, wherein:
each of the base stations transmits a pilot signal to the plurality of terminals, and
the signal quality information is generated by each terminal based on the received pilot signal.

5. The network apparatus of claim 1, wherein the terminal selection unit calculates a data rate with respect to each terminal included in each of the terminal groups, based on the signal quality information, and determines the target terminal based on the data rate.

6. A communication system comprising:
a plurality of base stations configured to transmit data;
a plurality of terminals configured to receive the transmitted data;
a network apparatus configured to:
receive, from each of the plurality of terminals, signal quality information indicating the quality of a signal received from each of the plurality of base stations;
group the plurality of terminals into a plurality of terminal groups, based on the signal quality information;
respectively associate first, second and third base stations, of the plurality of base stations, with first, second and third terminal groups, of the plurality of terminal groups;
select concurrently a first target terminal from the first terminal group, a second target terminal from the second terminal group and a third target terminal from the third terminal group;
adjust the phase of a transmission by the second base station so as to be received, by the first target terminal, in alignment with the phase of a transmission by the third base station;
adjust the phase of a transmission by the first base station so as to be received, by the second target terminal, in alignment with the phase of a transmission by the third base station; and
adjust the phase of a transmission by the first base station so as to be received, by the third target terminal, in alignment with the phase of a transmission by the second base station, wherein:
the association of a base station with a terminal group identifies which base station is assigned to transmit data to the terminal group, and
the network apparatus selects concurrently the first, second, third target terminals based on a total data rate with respect to a combination of the each terminal of the first, second and third terminal groups.

7. The communication system of claim 6, wherein the signal quality information is a signal-to-noise ratio (SNR) or a signal-to-interference and noise ratio (SINR).

8. A method of transmitting data, the method comprising:
receiving, from each of a plurality of terminals, signal quality information indicating the quality of a signal received from each of a plurality of base stations;
grouping the plurality of terminals into a plurality of terminal groups, based on the signal quality information;
respectively associating first, second and third base stations, of the plurality of base stations, with first, second and third terminal groups, of the plurality of terminal groups;
selecting concurrently a first target terminal from the first terminal group, a second target terminal from the second terminal group and a third target terminal from the third terminal group, the first, second, third target terminals being selected based on a total data rate with respect to a combination of the each terminal of the first, second and third terminal groups; and
adjusting the phase of a transmission by the second base station so as to be received, by the first target terminal, in alignment with the phase of a transmission by the third base station, adjusting the phase of a transmission by the first base station so as to be received, by the second target terminal, in alignment with the phase of a transmission by the third base station, adjusting the phase of a transmission by the first base station so as to be received, by the third target terminal, in alignment with the phase of a transmission by the second base station, wherein
the association of a base station with a terminal group identifies which base station is assigned to transmit data to the terminal group.

9. The method of claim 8, wherein the signal quality information is a signal-to-noise ratio (SNR) or a signal-to-interference and noise ratio (SINR).

10. The method of claim 8, wherein the terminals within each terminal group reported signal quality information for the same base station, which is associated with the terminal group, that is greater than or equal to a predetermined reference value.

11. The method of claim 8, wherein:
each of the base stations transmits a pilot signal to the plurality of terminals, and
the signal quality information is generated by each terminal based on the received pilot signal.

12. The method of claim 8, further comprising calculating a data rate with respect to each terminal included in each of the terminal groups, based on the signal quality information, and determining the target terminal based on the data rate.

13. A non-transitory computer-readable recording medium storing a program to implement a method of transmitting data, comprising instructions to cause a computer to:
receive, from each of a plurality of terminals, signal quality information indicating the quality of a signal received from each of a plurality of base stations;
group the plurality of terminals into a plurality of terminal groups, based on the signal quality information;
respectively associate first, second and third base stations, of the plurality of base stations, with first, second and third terminal groups, of the plurality of terminal groups;
select concurrently a first target terminal from the first terminal group, a second target terminal from the second terminal group and a third target terminal from the third terminal group, the first, second, third target terminals being selected based on a total data rate with respect to a combination of the each terminal of the first, second and third terminal groups;
adjust the phase of a transmission by the second base station so as to be received, by the first target terminal, in alignment with the phase of a transmission by the third base station;
adjust the phase of a transmission by the first base station so as to be received, by the second target terminal, in alignment with the phase of a transmission by the third base station; and
adjust the phase of a transmission by the first base station so as to be received, by the third target terminal, in alignment with the phase of a transmission by the second base station, wherein
the association of a base station with a terminal group identifies which base station is assigned to transmit data to the terminal group.

\* \* \* \* \*